United States Patent [19]
Silvis et al.

[11] Patent Number: 5,464,924
[45] Date of Patent: Nov. 7, 1995

[54] FLEXIBLE POLY(AMINO ETHERS) FOR BARRIER PACKAGING

[75] Inventors: H. Craig Silvis; Shari L. Kram, both of Midland, Mich.

[73] Assignee: The Dow Chemical Company, Midland, Mich.

[21] Appl. No.: 179,030

[22] Filed: Jan. 7, 1994

[51] Int. Cl.$^6$ .......................... C08G 59/22; C08G 59/50; C08G 59/64; C08G 73/02

[52] U.S. Cl. ...................... 528/102; 528/111; 528/120; 528/406; 528/407

[58] Field of Search ................................ 528/407, 106, 528/116, 117, 119, 121, 405, 422, 102, 111, 118, 120, 406

[56] References Cited

U.S. PATENT DOCUMENTS

| | | | |
|---|---|---|---|
| 3,211,684 | 10/1965 | Eakins | 528/407 |
| 3,299,169 | 1/1967 | Smith | 528/110 |
| 3,349,053 | 10/1967 | Ashby | 528/407 |
| 3,519,603 | 7/1970 | Lohse et al. . | |
| 3,580,887 | 5/1971 | Hubin . | |
| 3,943,104 | 3/1976 | Waddill . | |
| 4,267,301 | 5/1981 | Olsen et al. . | |
| 4,383,101 | 5/1983 | Olsen et al. . | |
| 4,554,297 | 11/1985 | Dabi . | |
| 4,647,648 | 3/1987 | Silvis et al. | 528/102 |
| 4,672,102 | 6/1987 | Silvis et al. | 528/97 |
| 4,675,373 | 6/1987 | Yatsu et al. . | |
| 4,780,524 | 10/1988 | Dobbelstein et al. . | |
| 4,825,000 | 4/1989 | Larkin et al. . | |
| 5,026,743 | 6/1991 | Beresford et al. . | |
| 5,032,629 | 7/1991 | Hansen et al. . | |
| 5,112,934 | 5/1992 | Kester et al. | 528/99 |
| 5,275,853 | 1/1994 | Silvis et al. | 428/35.4 |

FOREIGN PATENT DOCUMENTS

0479445A2  8/1992  European Pat. Off. .

*Primary Examiner*—Jeffrey Mullis

[57] ABSTRACT

Polyaminoethers prepared by reacting (1) a primary amine or bis(secondary) diamine with (2) a diglycidyl ether and (3) an amine- or epoxy-functionalized poly(alkylene oxide) exhibit a combination of low glass transition temperature (Tg of 14° C. to 73° C.) and low oxygen transmission rate (OTR of 0.53 to 19.0 cc-mil/100-in$^2$-atm-day).

8 Claims, No Drawings

FLEXIBLE POLY(AMINO ETHERS) FOR BARRIER PACKAGING

BACKGROUND OF THE INVENTION

This invention relates to thermoplastic polyethers having pendant hydroxyl moieties and to methods of using them as barrier articles to protect oxygen-sensitive materials.

Hydroxyphenoxyether polymers are known to be useful in the fabrication of articles exhibiting barrier properties. See, for example, Reinking et al., *J. Poly. Sci.*, Vol. 7, pp. 2135–2144, pp. 2145–2152 and pp. 2153– 2160 (1963) and *Encyclopedia of Polymer Science and Technology*, Vol. 10, pp. 111–122. Such polymers generally have only moderate oxygen barrier, i.e., they generally exhibit oxygen transmission rates of 2 to 75 $cm^3$-mil/100 $in^2$-atm($O_2$)-day.

In view of the limited barrier properties of the prior art polymers having pendant hydroxyl moieties and phenoxyether moieties, it would be highly desirable to provide a polymer having a high barrier to oxygen (i.e., oxygen transmission rate less than 20 $cm^3$-mil/ 100-$in^2$-atm($O_2$)-day). Polymers that retain such high barrier in both dry and moist environments and can be fabricated into flexible films would be especially desirable.

SUMMARY OF THE INVENTION

The present invention is, in a first aspect, a hydroxy-functional polyaminoether comprising repeat units represented by the formula:

Formula I

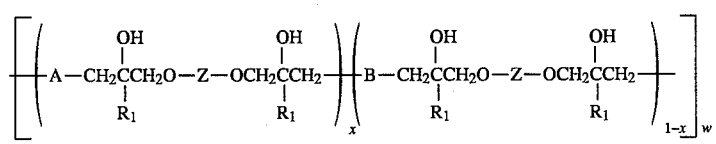

wherein each A is individually an amino group represented by one of the formulas:

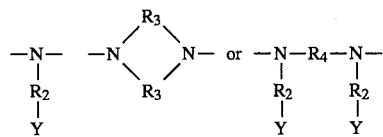

wherein each $R_1$ is independently hydrogen, methyl, or mixtures thereof; each $R_2$ is independently a $C_2$–$C_{20}$ alkylene or phenylene; each $R_3$ is independently a $C_2$–$C_{10}$ substituted or unsubstituted alkylene, wherein the substituent(s) is alkylamido, hydroxy, alkoxy, halo, cyano, aryloxy, alkylcarbonyl or arylcarbonyl; each $R_4$ is independently a substituted or unsubstituted $C_2$–$C_{20}$ alkylene wherein the substituent(s) is the same as that for $R_3$ and Y is individually alkylamido, hydroxy, alkoxy, halo, cyano, aryloxy, alkylcarbonyl or arylcarbonyl; B is represented by the formula:

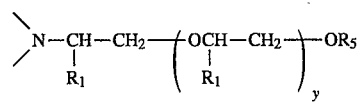

wherein $R_1$ is as previously defined and $R_5$ is a $C_1$–$C_{10}$ alkyl; y is from about 1 to about 40; each Z is individually an alkylene, an arylene, a poly(alkylene oxide) or mixtures thereof; w is a whole number from about 10 to about 400; and x is from 0 to about 1, with the proviso that when x is 1, Z is a poly(alkylene oxide).

In a second aspect, the present invention is a process for preparing the polyaminoether which comprises reacting (1) a primary amine, a bis(secondary) diamine, or a monoamine-functionalized poly(alkylene oxide) or mixtures thereof with (2) a diglycidyl ether or a diepoxy-functionalized poly(alkylene oxide) under conditions sufficient to cause the amine moieties to react with the epoxy moieties to form a polymer backbone having amine linkages, ether linkages and pendant hydroxyl moieties.

In a third aspect, the present invention is an article suitable for packaging oxygen-sensitive materials such as foodstuffs and medicines. The article is fabricated from the polyaminoether and can be in the form of a molded or coextruded container, or an impermeable monolayer or multilayer film.

Surprisingly, these polyaminoethers exhibit a combination of low glass transition temperature (Tg of 14° C. to 73° C.) and low oxygen transmission rate (OTR of 0.53 to 19.0 cc-mil/100-$in^2$-atm-day).

In addition to their use as barrier containers and films, the polymers of this invention are also useful as molding, extrusion and casting resins.

DETAILED DESCRIPTION OF THE INVENTION

Preferably, the polyaminoether is represented by the formula:

Formula II

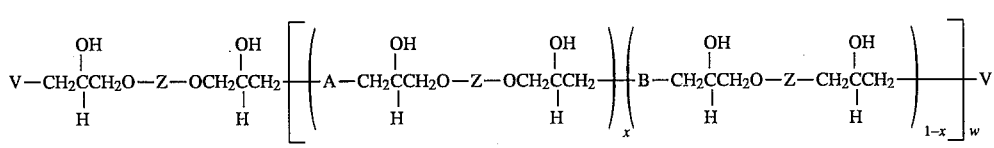

wherein A and B are as defined previously; y is from 10 to about 35; w is a whole number from about 100 to about 350; and x is from about 0.3 to about 0.8; each Z is individually a $C_2$–$C_{10}$ substituted or unsubstituted alkylene, a substituted or unsubstituted m-phenylene, p-phenylene, carbonyldiphenylene, sulfonyldiphenylene, isopropylidenediphenylene, methylenediphenylene, biphenylene, oxydiphenylene, diphenylene sulfide, naphthylene, diphenylenecyanomethane, or mixtures thereof; wherein the substituent(s) is alkylamido, hydroxy, alkoxy, halo, cyano, aryloxy, alkylcarbonyl or arylcarbonyl; or a poly(alkylene oxide) of the general formula:

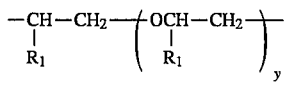

wherein $R_1$ is as previously defined; V is individually a secondary amine, a tertiary amine or mixtures thereof; x is from about 0.2 to about 1; y is from about 10 to 35 and w is a whole number from about 100 to about 350.

In the more preferred embodiment of this invention, x is from about 0.4 to about 0.8; y is from about 20 to about 30; and w is a whole number from about 200 to about 300; each Z is individually isopropylidenediphenylene, methylenediphenylene, a $C_2$ alkylene, a poly(alkylene oxide) or mixtures thereof, wherein the polyalkylene oxide is represented by the general formula:

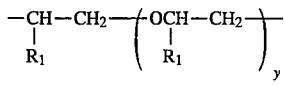

wherein $R_1$ is hydrogen, methyl, or mixtures thereof; y is from about 20 to about 30; and each V is individually a secondary amine represented by one of the formulas:

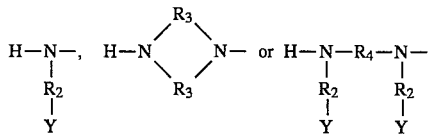

wherein $R_2$, $R_3$, $R_4$, and Y are as defined previously, or a tertiary amine represented by one of the formulas:

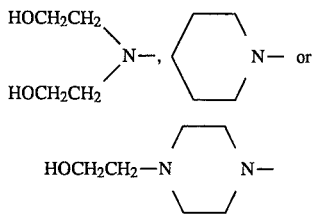

In the event a true thermoplastic polymer is desired, the end group should be a secondary or tertiary amine, instead of a glycidyl end group.

In the most preferred embodiment of this invention, Z is isopropylidenediphenylene or methylenediphenylene; V is a tertiary amine represented by one of the above formulas; x is from 0.5 to 0.6, w is from about 200 to about 300; y is about 25 and w is about 250.

The polyaminoethers of the present invention can be prepared by reacting (1) a primary amine, a bis(secondary) diamine, or a mono-amine-functionalized poly(alkylene oxide) or mixtures thereof with (2) a diglycidyl ether or a diepoxy-functionalized poly(alkylene oxides) under conditions sufficient to cause the amine moieties to react with the epoxy moieties to form a polymer backbone having amine linkages, ether linkages and pendant hydroxyl moieties.

Primary amines which can be employed in the practice of the present invention to prepare the polymers include aniline and substituted anilines, e.g., 4-(methylamido)aniline, 4-methylaniline, 4-methoxy-aniline, 4-tert-butylaniline, 3,4-dimethoxyaniline, 3,4-dimethylaniline; alkylamines, and substituted alkyl amines, e.g., butylamine and benzylamine; and alkanol amines; e.g., 2-aminoethanol and 1-aminopropan-2-ol. Preferred primary amines are aniline, 4-methoxyaniline, 4-tert-butylaniline, butylamine, and 2-aminoethanol. The most preferred primary amine is 2-aminoethanol.

Bis-secondary amines which can be employed in the practice of the present invention to prepare the polymers include piperazine and substituted piperazines, e.g., dimethylpiperazine and 2-methylamidopiperazine; bis(N-methylamino)benzene, 1,2-bis(N-methylamino)ethane, and N,N'-bis(2-hydroxyethyl)ethylenediamine. Preferred bis-secondary amines are piperazine, dimethylpiperazine, and 1,2-bis(N-methylamino )ethane. The most preferred bis-secondary amine is piperazine.

Amine-functionalized poly(alkylene oxides) which can be employed in the practice of the present invention to prepare the polymers include those materials represented by the general formula:

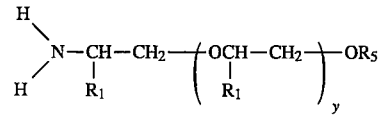

wherein $R_1$ is hydrogen, methyl, or mixtures thereof; $R_5$ is methyl and y is from about 1 to about 40. Typical of amines of this class are the "M" series Jeffamine™ products manufactured by Texaco Chemical Company. They are prepared by polymerizing ethylene oxide, propylene oxide, or mixtures thereof with aliphatic alcohol initiators and then subsequently converting the resulting terminal hydroxyl group to an amine moiety.

Epoxy-functionalized poly(alkylene oxides) which can be employed in the practice of the present invention to prepare the polymers include those materials represented by the general formula:

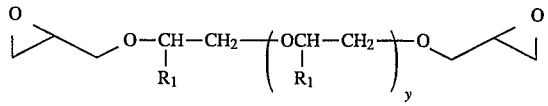

wherein $R_1$ is hydrogen, methyl, or mixtures thereof; and y is from about 1 to about 40. Typical of epoxides of this class are the "700" series D.E.R.™ epoxy resins manufactured by The Dow Chemical Company. They are synthesized by polymerizing ethylene oxide, propylene oxide, or mixtures thereof with hydroxide initiators and then reacting the resulting poly(alkylene oxide) diol with epichlorohydrin.

As used herein, the term "diglycidyl ether" means the reaction product of an aromatic, aliphatic, or poly(alkylene oxide) diol with epichlorohydrin.

Diglycidyl ethers which can be employed in the practice of the present invention for preparing the polymers include the diglycidyl ethers of the amide-containing bisphenols such as N,N'-bis(hydroxyphenyl)alkylenedicarboxamides, N,N'-bis(hydroxyphenyl)arylenedicarboxamides, bis(hydroxybenzamido)alkanes or bis(hydroxybenzamido)arenes, N-(hydroxyphenyl)hydroxybenzamides, 2,2-bis(hydroxyphenyl)acetamides, N,N'-bis(3-hydroxyphenyl)glutaramide, N,N'-bis(3-hydroxyphenyl) adipamide, 1,2-bis(4-hydroxybenzamido)ethane, 1,3-bis(4-hydroxybenzamide)benzene, N-(4-hydroxyphenyl)-4-hydroxybenzamide, and 2,2-bis(4-hydroxyphenyl)acetamide, 9,9-bis(4-hydroxyphenyl)fluorene, 4,4'-methylene bisphenol (bisphenol F), hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenyl, 4,4'-dihydroxybiphenylene oxide, bis(4-hydroxyphenyl)methane, α,α-bis(4-hydroxyphenyl)ethylbenzene, 2,6-dihydroxynaphthalene and 4,4'-isopropylidene bisphenol (bisphenol A). More preferred diglycidyl ethers are the diglycidyl ethers of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, bisphenol F, tetrabromoisopropylidenebisphenol, dihydroxy dinitrofluorenylidenediphenylene, 4,4'-biphenyl, 4,4'-dihydroxybiphenylene oxide, bis(4-hydroxyphenyl)methane, α,α-bis(4-hydroxyphenyl)ethyl-benzene, 2,6-dihydroxynaphthalene and 4,4'-isopropylidene bisphenol (bisphenol A). Most preferred diglycidyl ethers are the diglycidyl ethers of 4,4'-isopropylidene bisphenol (bisphenol A), 4,4'-sulfonyldiphenol, 4,4'-oxydiphenol, 4,4'-dihydroxybenzophenone, 9,9-bis(4-hydroxy-phenyl)fluorene and bisphenol F.

The conditions at which the reaction is most advantageously conducted are dependent on a variety of factors, including the specific reactants, solvent, and catalyst employed but, in general, the reaction is conducted under a non-oxidizing atmosphere such as a blanket of nitrogen, preferably at a temperature from about 100° C. to about 190° C., more preferably at a temperature from about 140° C. to about 150° C. The reaction can be conducted neat (without solvent or other diluents). However, in order to ensure homogeneous reaction mixtures at such temperatures, it is often desirable to use inert organic solvents for the reactants. Examples of suitable solvents include dipropylene glycol methyl ether, available commercially as Dowanol™ DPM, a product of The Dow Chemical Company, and the ethers or hydroxy ethers such as diglyme, triglyme, diethylene glycol ethyl ether, diethylene glycol methyl ether, dipropylene glycol methyl ether, propylene glycol phenyl ether, propylene glycol methyl ether and tripropylene glycol methyl ether.

It is desirable to end-cap residual epoxy groups or, in some cases, control molecular weight with monofunctional reactants (compounds having one reactive group) such as carboxylic acids, thiols, monofunctional sulfonamides, secondary amines and monohydric phenols. Preferred monofunctional reactants include acetic acid, benzoic acid, thiophenol, N-methylbenzenesulfonamide, diethanolamine, piperidine, N-(2-hydroxyethyl)piperazine, phenol and tert-butylphenol.

The polymers are recovered from the reaction mixture by conventional methods. For example, the reaction mixture containing the polymer can be diluted with a suitable solvent such as dimethyl formamide, cooled to room temperature, and the polymer isolated by precipitation from a non-solvent such as a 4:1 mixture of water and methanol. The precipitated polymer can then be purified, for example, by washing with water. The polymer is collected by filtration, washed with a suitable non-solvent, such as water or methyl alcohol and then dried.

Films prepared from the amino ether polymer of the present invention generally have oxygen transmission rates (OTR) from about 0.5 to about 20 cc-mil/100-in$^2$-atm-day, at 25° C. and 60% relative humidity (ASTM D-3985).

Films, containers and molded parts can be fabricated from the polyamino ethers of the present invention by using conventional fabricating techniques for thermoplastic polymers such as compression molding, injection molding, extrusion, thermoforming, blow molding and solvent casting.

The following working examples are given to illustrate the invention and should not be construed as limiting its scope. Unless otherwise indicated, all parts and percentages are by weight.

EXAMPLE 1

To a 100 mL resin flask equipped with overhead stirring, condenser, nitrogen inlet and a thermocouple, are added 1.993 g (32.63 mmol) of 2-aminoethanol, 4.911 g (8.16 mmol) of Jeffamine™ M-600 and 14.058 g (40.79 mmol) of the diglycidyl ether of bisphenol-A. To this mixture is added 20 mL of Dowanol™ DPM as solvent. The contents of the flask are heated to about 80° C., at which point the reaction exotherms to about 140° C. and viscosity build-up is apparent. The reaction is maintained at 140° C. to 150° C. for about 4 hours with additions of solvent in order to maintain efficient stirring. At this point, 0.5 mL of hydroxyethylpiperazine is added to cap any residual epoxide groups. Upon cooling to about 70° C., 25 mL of dimethylformamide is added to dilute the viscous polymer solution. After stirring overnight, the polymer is isolated by precipitation into a mixture of water/methanol (4/1 v/v), yielding a white solid mass which is filtered, washed with water and vacuum dried at about 100° C. overnight. The yield of polymer is 19.7 g (94%). The polymer exhibits an inherent viscosity in DMF at 25° C. of 0.78 dL/g. Compression molded films of the polymer exhibit an oxygen transmission rate (OTR) of 12.1 cc-mil/100-in$^2$-atm-day at 64% relative humidity and a glass transition temperature of 32° C. NMR data on the polymer is consistent with the following structure:

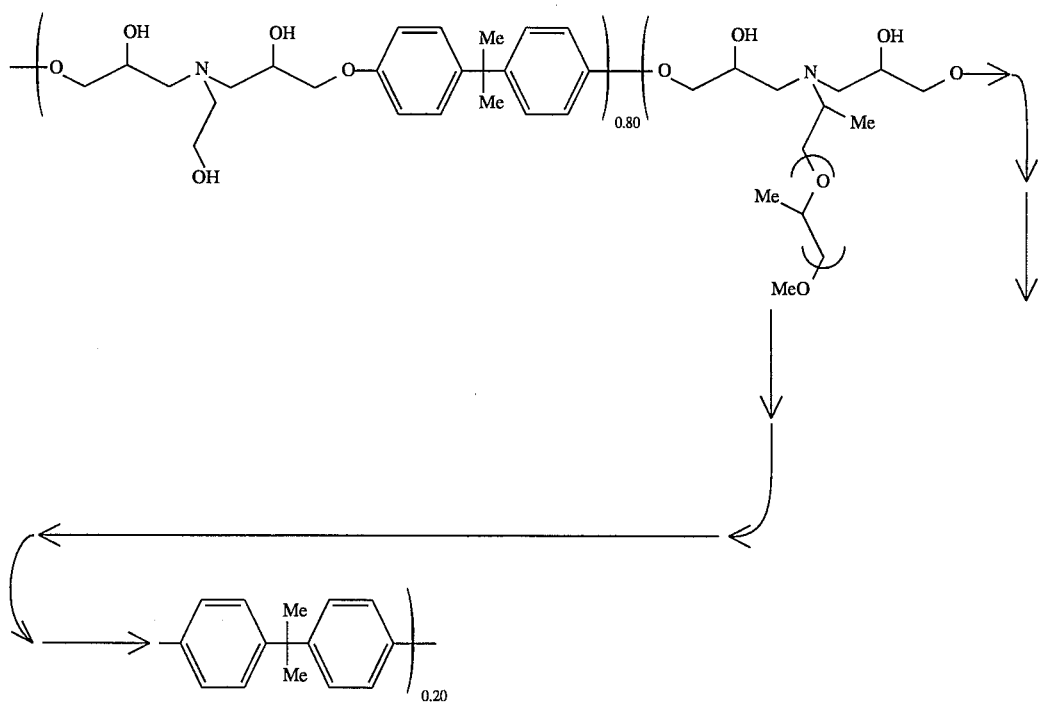

Other compositions which are shown in Table 1 are similarly prepared. Their properties are also shown in the table.

TABLE 1

| Monomer A | Monomer B | Monomer C | Inherent Viscosity[a] (dL/g) | Glass Transition[b] (°C.) | OTR[c] |
|---|---|---|---|---|---|
| Piperazine 0.9 | Jeffamine ™ M-2005[d] 0.1 | Bisphenol-A diglycidyl ether 1.0 | 0.38 | 73 | 19.0 |
| Piperazine 0.8 | Jeffamine M-600[e] 0.2 | Bisphenol-A diglycidyl ether 1.0 | 0.64 | 44 | 11.7 |
| Aminoethanol 0.8 | Jeffamine M-600[e] 0.2 | Bisphenol-F diglycidyl ether 1.0 | 0.34 | 27 | 5.0 |
| Aminoethoxy-ethanol 0.8 | Jeffamine M-600[e] 0.2 | Bisphenol-F diglycidyl ether 1.0 | 0.38 | 14 | 18.5 |
| Aminoethanol 1.0 | DER ™ 736[f] 0.2 | Bisphenol-A diglycidyl ether 0.8 | 1.52 | 52 | 0.53 |
| Aminoethanol 1.0 | DER ™ 732[g] 0.2 | Bisphenol-A diglycidyl ether | 0.50 | 35 | 3.0 |

TABLE 1-continued

| Monomer A | Monomer B | Monomer C | Inherent Viscosity[a] (dL/g) | Glass Transition[b] (°C.) | OTR[c] |
|---|---|---|---|---|---|
| Aminoethanol 0.8 | Jeffamine M-600[e] 0.2 | 0.8 Bisphenol-A diglycidyl ether 1.0 | 0.78 | 32 | 12.1 |

[a] Inherent Viscosity in DMF at 0.5 dL/g and 25° C.
[b] Glass transition temperature determined using a DuPont Model 2100 differential scanning calorimeter (DSC) operation in a heating mode at 20° C./minute
[c] Oxygen transmission rates (OTR) measured in cc-mil/100 in²-atm-day
[d] Jeffamine ™ M-2005 = a mono-amine-functionalized poly(alkylene oxide) of approximately 2000 molecular weight
[e] Jeffamine ™ M-600 = a mono-amine-functionalized poly(alkylene oxide) of approximately 600 molecular weight
[f] DER ™ 736 = a poly(alkylene oxide) diepoxide of approximately 380 molecular weight
[g] DER ™ 732 = a poly(alkylene oxide) diepoxide

What is claimed is:

1. A thermoplastic hydroxyfunctional polyaminoether represented by the formula:

Formula I

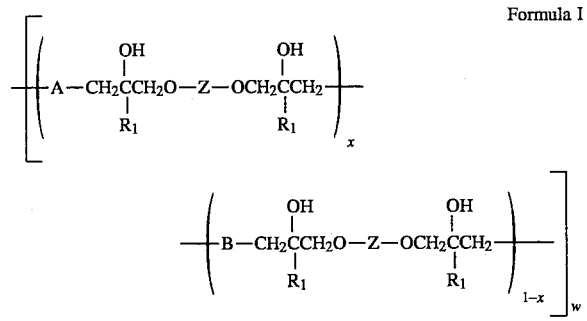

wherein each A is individually an amino group represented by one of the formulas:

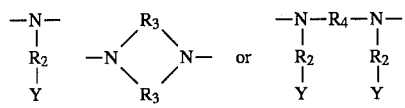

wherein $R_1$ is hydrogen, methyl, or mixtures thereof; $R_2$ is $C_2$-$C_{20}$ alkylene or phenylene; $R_3$ is $C_2$-$C_{10}$ substituted or unsubstituted alkylene wherein the substituent(s) is alkylamido, hydroxy, alkoxy, halo, cyano, aryloxy, alkylcarbonyl or arylcarbonyl; $R_4$ is substituted or unsubstituted $C_2$-$C_{20}$ alkylene wherein the substituent(s) is the same as that for $R_3$ and Y is individually alkylamido, hydroxy, alkoxy, halo, cyano, aryloxy, alkylcarbonyl or arylcarbonyl; B is represented by the formula:

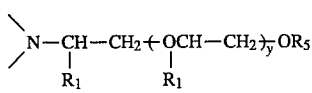

wherein $R_1$ is hydrogen, methyl or mixtures thereof; and $R_5$ is a $C_1$-$C_{10}$ alkyl; y is from 1 to about 40; each Z is individually an alkylene, a poly(alkylene oxide), substituted or unsubstituted m-phenylene, p-phenylene, carbonyldiphenylene, sulfonyldiphenylene, isopropylidenediphenylene, methylenediphenylene, biphenylene, oxidiphenylene, diphenylene sulfide, naphthylene, diphenylenecyano-methane, or mixtures thereof; wherein the substituent(s) is alkylamido, hydroxy, alkoxy, halo, cyano, aryloxy, alkylcarbonyl or arylcarbonyl or mixtures thereof; w is a whole number from about 10 to about 400; and x is from 0.2 to 0.8.

2. The polyaminoether of claim 1 wherein each Z is individually a substituted or unsubstituted m-phenylene, p-phenylene, carbonyldiphenylene, sulfonyldiphenylene, isopropylidenediphenylene, methylenediphenylene, biphenylene, oxydiphenylene, diphenylene sulfide, naphthylene, diphenylenecyano-methane, or mixtures thereof; wherein the substituent(s) is alkylamido, hydroxy, alkoxy, halo, cyano, aryloxy, alkylcarbonyl or arylcarbonyl, a $C_2$-$C_6$ alkylene, or a poly(alkylene oxide) of the general formula:

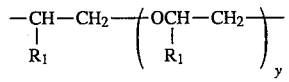

wherein $R_1$ is hydrogen, methyl or mixtures thereof and y is from 1 to about 40.

3. The polyaminoether of claim 1 in the form of a barrier container, film or coating.

4. The polyaminoether of claim 1 represented by the formula:

Formula II

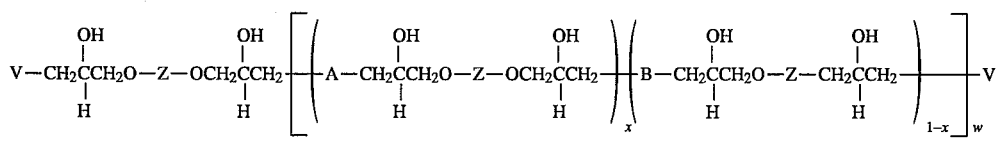

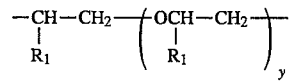

wherein:

each A is individually an amino group represented by one of the formulas:

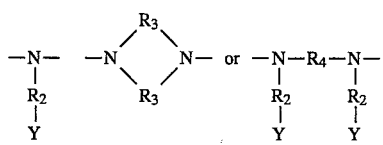

wherein $R_2$ is $C_2$–$C_{20}$ alkylene or phenylene; $R_3$ is $C_2$–$C_{10}$ substituted or unsubstituted alkylene wherein the substituent(s) is alkylamido, hydroxy, alkoxy, halo, cyano, aryloxy, alkylcarbonyl or arylcarbonyl; $R_4$ is substituted or unsubstituted $C_2$–$C_{20}$ alkylene wherein the substituent(s) is the same as that for $R_3$ and Y is individually alkylamido, hydroxy, alkoxy, halo, cyano, aryloxy, alkylcarbonyl or arylcarbonyl;

each B is represented by the formula:

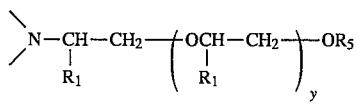

wherein $R_1$ is hydrogen, methyl or mixtures thereof; $R_5$ is a $C_1$–$C_{10}$ alkyl; and y is from about 10 to about 35;

each Z is individually a substituted or unsubstituted $C_2$–$C_{10}$ alkylene, m-phenylene, p-phenylene, carbonyldiphenylene, sulfonyldiphenylene, isopropylidenediphenylene, methylenediphenylene, biphenylene, oxydiphenylene, diphenylene sulfide, naphthylene, diphenylenecyano-methane, or mixtures thereof; wherein the substituent(s) is alkylamido, hydroxy, alkoxy, halo, cyano, aryloxy, alkylcarbonyl or arylcarbonyl, or a poly(alkylene oxide) of the general formula:

wherein $R_1$ is hydrogen, methyl or mixtures thereof; y is from about 10 to about 35;

V is individually a secondary amine, a tertiary amine or mixtures thereof;

w is a whole number from about 100 to about 350; and x is from 0.3 to 0.8.

5. The polyaminoether of claim 4 wherein the secondary amine is represented by one of the formulas:

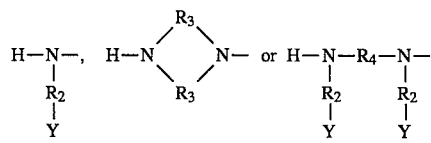

wherein $R_2$, $R_3$, $R_4$, and Y are as defined in claim 4, and the tertiary amine is represented by one of the formulas:

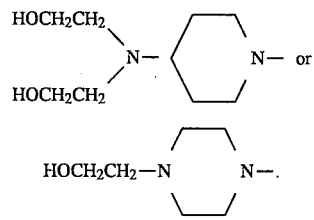

6. A process for preparing the polyaminoether of claim 4 wherein V is a tertiary amine comprising reacting (1) a mono-amine-functionalized poly(alkylene oxide) and either a primary amine or a bis(secondary) diamine with (2) a diglycidyl ether or a diepoxy-functionalized poly(alkylene oxides) under conditions sufficient to cause the amine moieties to react with the epoxy moieties to form a polymer backbone having amine linkages, ether linkages and pendant hydroxyl moieties, and then end-capping the polymer with a secondary amine to eliminate residual epoxy end groups.

7. The polyaminoether of claim 4 wherein each of $R_2$, $R_3$ and $R_4$ is a $C_2$ alkylene, Y is individually hydroxy, alkoxy or alkylamido, and Z is a $C_2$ alkylene, isopropylidenediphenylene, or methylenediphenylene; each V is individually a secondary or tertiary amine or mixtures thereof.

8. The polyaminoether of claim 7 wherein Y is hydroxy, Z is isopropylidenediphenylene and V is a secondary or tertiary amine or mixtures thereof.

* * * * *

UNITED STATES PATENT AND TRADEMARK OFFICE
CERTIFICATE OF CORRECTION

PATENT NO. : 5,464,924
DATED : November 7, 1995
INVENTOR(S) : H. Craig Silvis; Shari L. Kram It is certified that error appears in the above-identified patent and that said Letters Patent is hereby corrected as shown below:

Title page, column 2, Abstract, line 2, "diglyeidyl" should correctly read -- diglycidyl --

Claim 6, column 12, line 52, following <u>diamine</u> insert -- ; --

Claim 6, column 12, line 54, "mole-" should correctly read -- moie- --

Signed and Sealed this

Tenth Day of November 1998

BRUCE LEHMAN

Attest:

Attesting Officer

Commissioner of Patents and Trademarks